United States Patent
Singh et al.

(10) Patent No.: US 11,156,102 B2
(45) Date of Patent: Oct. 26, 2021

(54) BLADE HAVING A TIP COOLING CAVITY AND METHOD OF MAKING SAME

(71) Applicant: General Electric Company, Schenectady, NY (US)

(72) Inventors: Anshuman Singh, Edmond, OK (US); Sze Bun Brian Chan, Marietta, GA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 240 days.

(21) Appl. No.: 15/925,109

(22) Filed: Mar. 19, 2018

(65) Prior Publication Data
US 2019/0284939 A1  Sep. 19, 2019

(51) Int. Cl.
*F01D 5/18*   (2006.01)
*F01D 5/22*   (2006.01)

(52) U.S. Cl.
CPC .............. *F01D 5/189* (2013.01); *F01D 5/18* (2013.01); *F01D 5/187* (2013.01); *F01D 5/225* (2013.01); *F05D 2240/307* (2013.01); *F05D 2240/81* (2013.01); *F05D 2260/202* (2013.01); *F05D 2260/205* (2013.01); *F05D 2260/221* (2013.01); *F05D 2260/2214* (2013.01)

(58) Field of Classification Search
CPC ... F01D 5/14; F01D 5/147; F01D 5/18; F01D 5/187; F01D 5/189; F01D 5/225; F05D 2230/10; F05D 2240/307; F05D 2240/81; F05D 2260/202; F05D 2260/205; F05D 2260/221; F05D 2260/2214
See application file for complete search history.

(56) References Cited

U.S. PATENT DOCUMENTS

| | | | |
|---|---|---|---|
| 6,499,950 B2 | 12/2002 | Willett et al. | |
| 6,682,304 B2* | 1/2004 | Beeck | F01D 5/081 416/189 |
| 6,761,634 B1* | 7/2004 | Peterson | A63F 3/00643 463/30 |
| 6,932,571 B2 | 8/2005 | Cunha et al. | |
| 7,568,882 B2* | 8/2009 | Brittingham | F01D 5/187 415/1 |
| 8,322,986 B2* | 12/2012 | DeSander | F01D 5/187 416/96 R |

(Continued)

FOREIGN PATENT DOCUMENTS

| | | |
|---|---|---|
| DE | 102008003412 A1 | 7/2008 |
| EP | 0874131 A2 | 10/1998 |

(Continued)

OTHER PUBLICATIONS

European Search Report and Written Opinion for Application No. 19161604.4-1006, dated Jul. 24, 2019; 7 pages.

*Primary Examiner* — Michael L Sehn
(74) *Attorney, Agent, or Firm* — Armstrong Teasdale LLP

(57) ABSTRACT

A blade includes an airfoil that extends from a root end to a tip end. The airfoil includes a cooling channel defined therein. The blade further includes a tip shroud extending from the tip end, and at least one fillet coupled between the tip end and the tip shroud. The at least one fillet includes an interior wall. The interior wall at least partially defines a cavity in downstream flow communication with the cooling channel.

18 Claims, 12 Drawing Sheets

(56) References Cited

U.S. PATENT DOCUMENTS

| | | | |
|---|---|---|---|
| 8,714,909 B2* | 5/2014 | Propheter-Hinckley | ..................... F01D 9/041 415/115 |
| 2009/0136347 A1 | 5/2009 | Brittingham et al. | |
| 2009/0180896 A1 | 7/2009 | Brittingham | |
| 2009/0304520 A1 | 12/2009 | Brittingham et al. | |
| 2010/0008759 A1 | 1/2010 | Johns et al. | |
| 2016/0047271 A1* | 2/2016 | Castaneda | ............... F01D 9/041 415/116 |
| 2017/0138203 A1* | 5/2017 | Jaiswal | ................... F01D 5/187 |

FOREIGN PATENT DOCUMENTS

| | | |
|---|---|---|
| EP | 2149675 A2 | 2/2010 |
| EP | 2599958 A2 | 6/2013 |
| WO | 2017020178 A1 | 2/2017 |

* cited by examiner

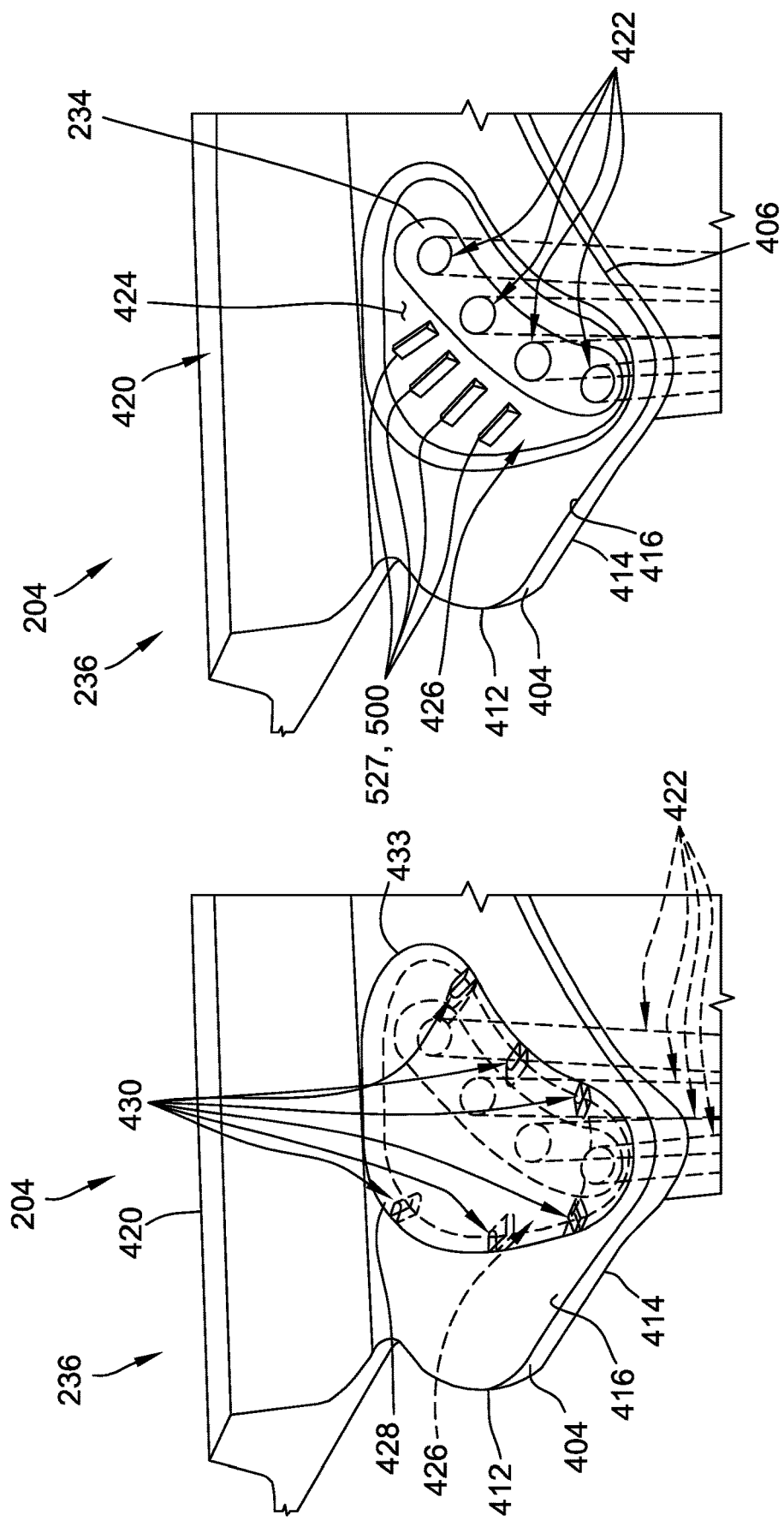

BLADE HAVING A TIP COOLING CAVITY AND METHOD OF MAKING SAME

BACKGROUND

The field of the disclosure relates generally to rotary machines, and more particularly, to cooling a tip shroud of a turbine blade.

At least some known rotary machines include a compressor, a combustor coupled downstream from the compressor, a turbine coupled downstream from the combustor, and a rotor shaft rotatably coupled between the compressor and the turbine. Some known turbines include at least one rotor disk coupled to the rotor shaft, and a plurality of circumferentially-spaced turbine blades that extend outward from each rotor disk to define a stage of the turbine. Each blade includes an airfoil that extends radially outward from a platform towards a turbine casing.

At least some known turbine blades include a shroud that extends from an outer tip end of the airfoil to reduce gas flow leakage between the airfoil and the turbine casing. Additionally, at least some known tip shrouds are coupled to the airfoil tip end at a fillet region located at the intersection of the airfoil and the shroud. An operational life cycle of at least some turbine blades, such as but not limited to latter stage turbine blades, is limited by creep. Creep is the tendency of a material to deform over time when exposed to a combination of mechanical loading and high temperature. Blade creep rate may be greatly impacted by peak stresses seen in the shroud and the fillet region, in combination with the high operating temperatures often seen at the tip shroud and the fillet region.

BRIEF DESCRIPTION

In one aspect, a blade is provided. The blade includes an airfoil that extends from a root end to a tip end. The airfoil includes a cooling channel defined therein. The blade further includes a tip shroud extending from the tip end, and at least one fillet coupled between the tip end and the tip shroud. The at least one fillet includes an interior wall. The interior wall at least partially defines a cavity in downstream flow communication with the cooling channel.

In another aspect, a rotary machine is provided. The rotary machine includes a combustor section and a turbine section coupled downstream from the combustor section. The turbine section includes at least one rotor assembly that includes at least one blade. The at least one blade includes an airfoil that extends in a radial direction from a root end to a tip end and includes a cooling channel defined therein. The blade further includes a tip shroud extending from the tip end, and at least one fillet coupled between the tip end and the tip shroud. A cavity is defined at least partially within the at least one fillet and in downstream flow communication with the cooling channel.

In a further aspect, a method of making a blade is provided. The method includes coupling at least one fillet between a tip end of an airfoil and a tip shroud. The airfoil extends radially from a root end to the tip end and includes a cooling channel defined therein. The method further includes forming an interior wall of the at least one fillet. The interior wall at least partially defines a cavity in downstream flow communication with the cooling channel.

DRAWINGS

FIG. 5 is a perspective view of a portion of a second exemplary embodiment of a blade, such as the blade shown in FIG. 3;

FIG. 6 is a perspective view of a portion of a third exemplary embodiment of a blade, such as the blade shown in FIG. 3;

DETAILED DESCRIPTION

Figure 1:
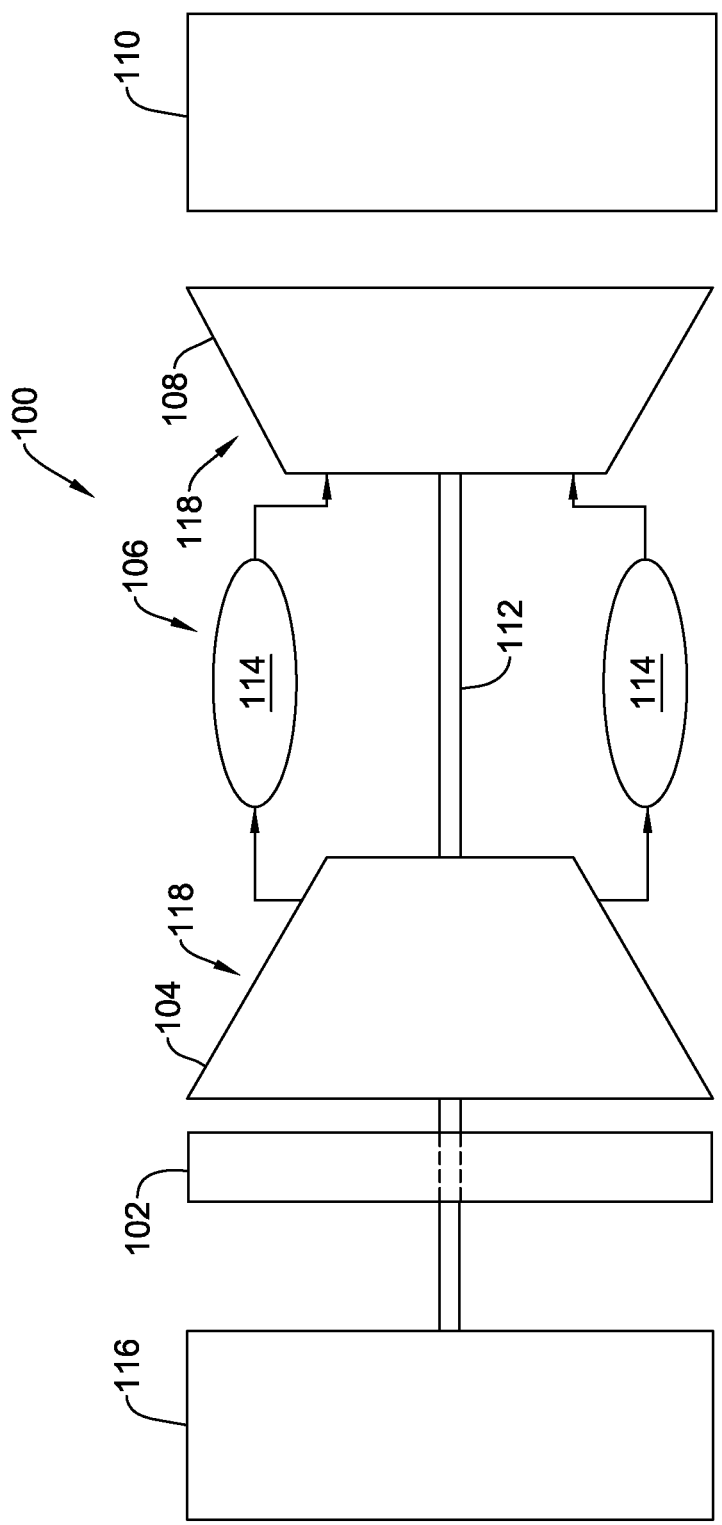
FIG. 1 is a schematic view of an exemplary rotary machine.

The exemplary systems and methods described herein overcome at least some disadvantages of known blades by providing a blade cooling cavity that facilitates improved creep performance as compared to known blades. More specifically, the embodiments described herein provide a blade that includes an airfoil and a tip shroud. The airfoil includes an axially extending cooling channel defined therein, and at least one fillet, such as a suction side fillet and/or a pressure side fillet, coupled to the tip shroud and a side of the airfoil. The blade further includes a cavity defined in the at least one fillet and in flow communication with the cooling channel. In some embodiments, an entirety of the cavity is axially forward of a tip shroud rail that extends across a mid-portion of the tip shroud. In certain embodiments, the cavity is further defined in two opposing fillets. In some embodiments, at least one flow feature is disposed within the cavity and is oriented to increase a cooling efficiency of cooling fluid received from the cooling channel. For example, the flow feature includes at least one partition oriented to direct the flow of cooling fluid through the cavity along a preselected flow path to facilitate more effective cooling of the fillet and tip shroud. For another example, the flow feature includes a turbulator projecting into the cavity such that a turbulence of the flow of cooling fluid within the cavity is increased, facilitating more effective cooling of the fillet and tip shroud. In some embodiments, the cavity extends through an upper surface of the tip shroud plate, and the tip shroud includes a closure plate that covers the cavity and includes one or more surface apertures configured to channel the exhausted cooling fluid out of the cavity.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, turbine engine system 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112.

Figure 2:
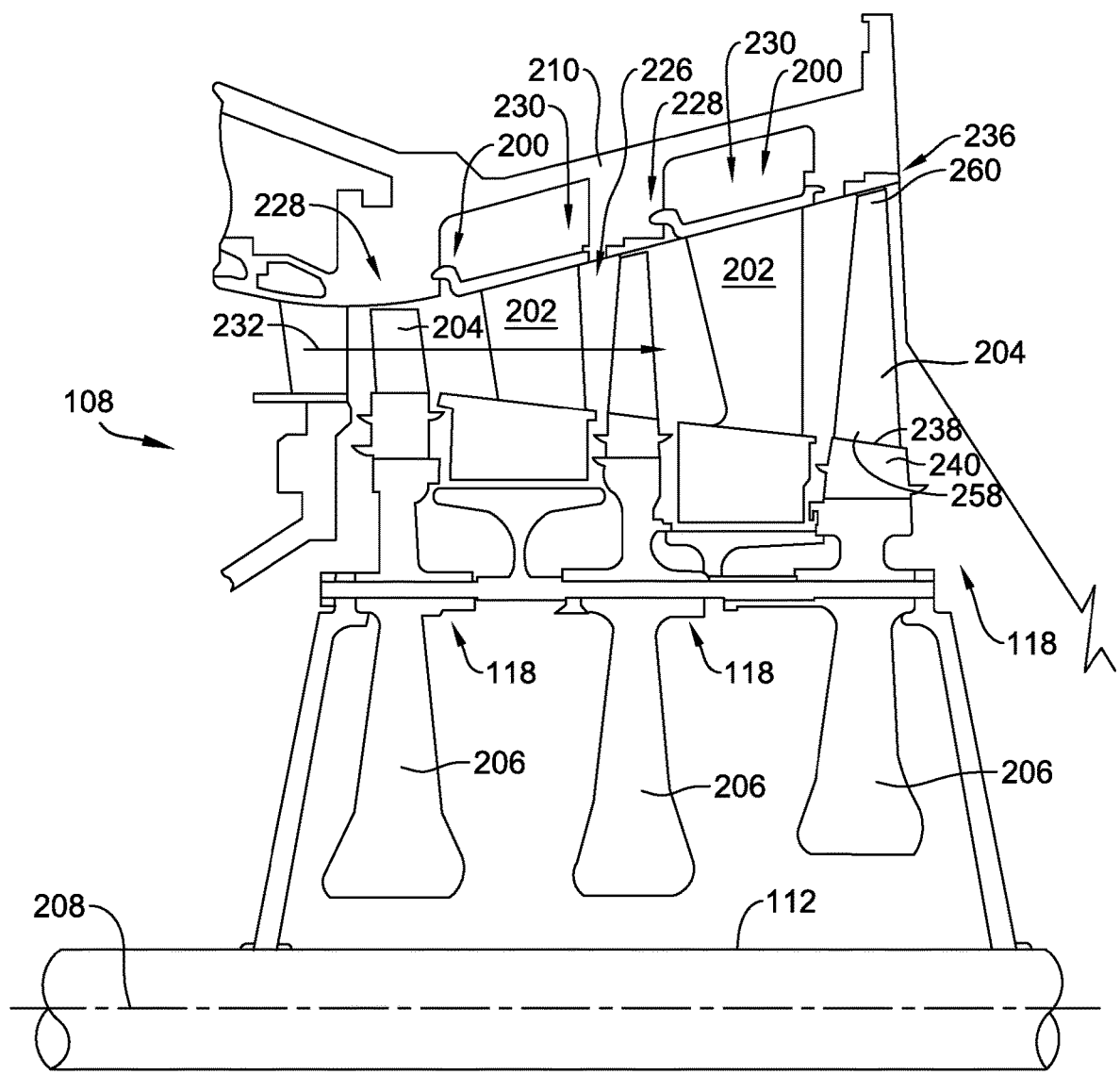
FIG. 2 is a partial sectional view of a portion of an exemplary rotor assembly that may be used with the exemplary rotary machine shown in FIG. 1.

FIG. 2 is a partial sectional view of a portion of an exemplary rotor assembly 118. In the exemplary embodiment, rotor assembly 118 is illustrated as part of turbine section 108. In alternative embodiments, rotor assembly 118 is part of compressor section 104. In the exemplary embodiment, turbine section 108 includes a plurality of stages 200 that each include a stationary row 230 of stator vanes 202 and a corresponding row 228 of rotating turbine blades 204. Turbine blades 204 in each row 228 are spaced circumferentially about, and extend radially outward from, a rotor disk 206. Each rotor disk 206 is coupled to rotor shaft 112 and rotates about a centerline axis 208 that is defined by rotor shaft 112. A casing 210 extends circumferentially about rotor assembly 118 and stator vanes 202. Stator vanes 202 are each coupled to casing 210 and extend radially inward from casing 210 towards rotor shaft 112. A combustion gas path 232 is defined between casing 210 and each rotor disk 206. Each row 228 and 230 of turbine blades 204 and stator vanes 202 extends at least partially through combustion gas path 232.

With reference to FIGS. 1 and 2, during operation, intake section 102 channels air towards compressor section 104. Compressor section 104 compresses air and discharges compressed air into combustor section 106 and towards turbine section 108. The majority of air discharged from compressor section 104 is channeled towards combustor section 106. More specifically, pressurized compressed air is channeled to combustors 114 wherein the air is mixed with fuel and ignited to generate high temperature combustion gases. The combustion gases are channeled towards combustion gas path 232, wherein the gases impinge upon turbine blades 204 and stator vanes 202 of turbine section 108 to facilitate imparting a rotational force on rotor assembly 118.

Figure 3:
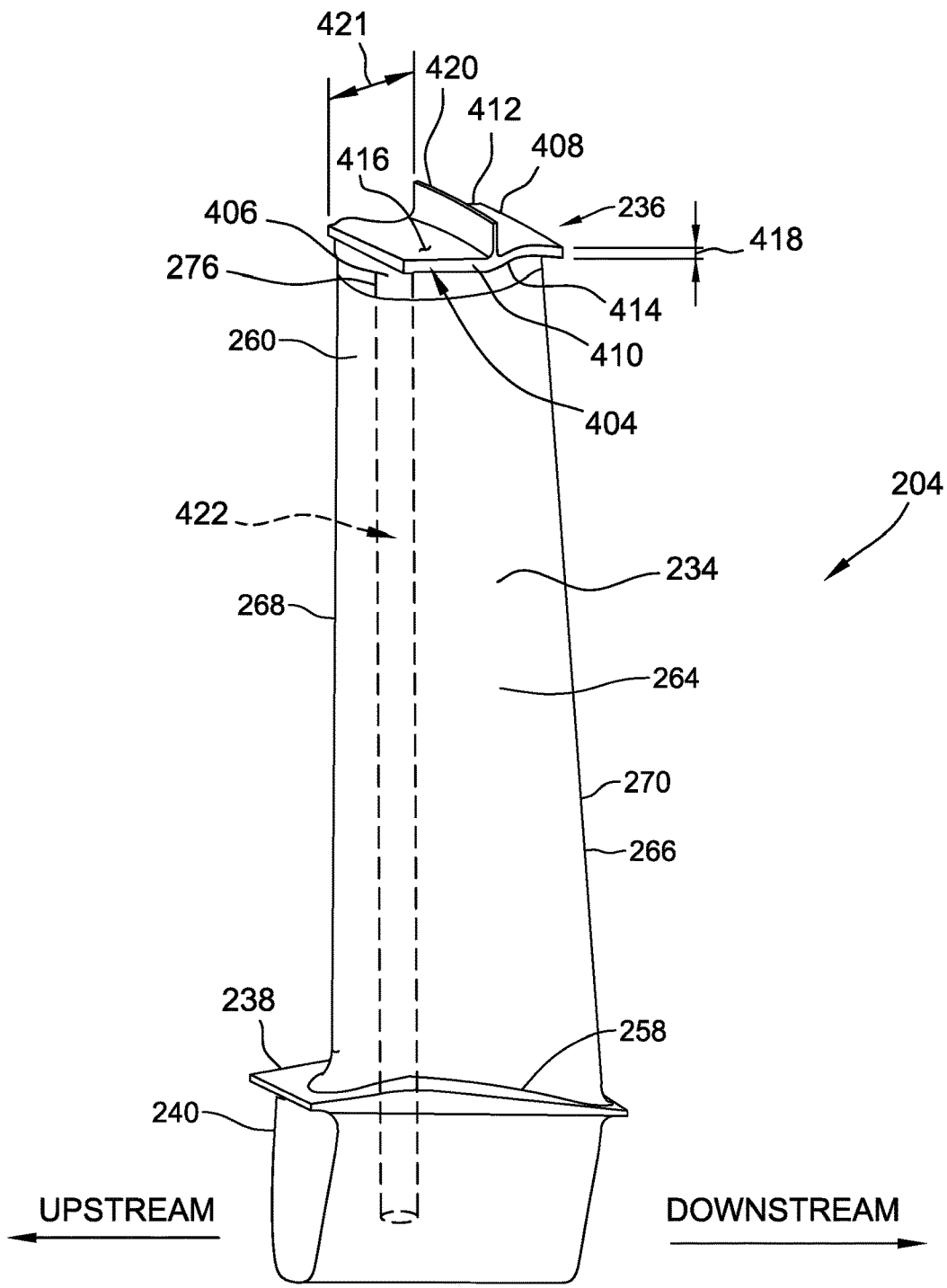
FIG. 3 is a perspective view of a pressure side of an exemplary blade that may be used with the rotor assembly shown in FIG. 2.

FIG. 3 is a perspective view of a pressure side 264 of an exemplary blade 204. Although the disclosure is discussed herein with respect to blade 204 for use with the at least one rotor assembly 118 of turbine section 108, it should be understood that the disclosure is likewise applicable to a blade for use with the at least one rotor assembly 118 of compressor section 104 (shown in FIG. 1). With reference to FIGS. 2 and 3, in the exemplary embodiment, each blade 204 includes an airfoil 234, a tip shroud 236, a platform 238, and a root 240. Airfoil 234 extends generally radially outwardly from platform 238, towards casing 210, to tip shroud 236. Root 240 extends radially inwardly from platform 238 and is configured to cooperate with rotor disk 206 to securely couple blade 204 to rotor disk 206.

In the exemplary embodiment, airfoil 234 extends radially between a root end 258, adjacent to platform 238, and a tip end 260, adjacent to tip shroud 236. Tip shroud 236 extends from tip end 260 of airfoil 234 and between tip end 260 and casing 210. At least a portion of the combustion gas that impinges upon turbine blades 204 is channeled between tip shroud 236 and casing 210.

Airfoil 234 has pressure side 264 and an opposite suction side 266. Each side 264 and 266 extends generally axially between a leading edge 268 and a trailing edge 270. Pressure side 264 is generally concave and suction side 266 is generally convex. At least one fillet is coupled to tip shroud 236 and airfoil 234 adjacent to airfoil tip end 260. More specifically, a pressure side fillet 276 is coupled to tip shroud 236 and pressure side 264 adjacent to airfoil tip end 260, and an opposite suction side fillet 278 (shown in FIG. 4) is coupled to tip shroud 236 and suction side 266 adjacent to airfoil tip end 260. Pressure side 264 and suction side 266, viewed in cross-section normal to the radial direction of airfoil 234, define an aerodynamic contour between root end 258 and tip end 260, and pressure side fillet 276 and suction side fillet 278 adjacent to tip end 260 include additional material positioned outside of the cross-section defined by pressure side 264 and suction side 266 to improve a structural integrity of the coupling of airfoil 234 and tip shroud 236. In some embodiments, airfoil 234 and tip shroud 236 are formed separately and positioned with respect to each other, and pressure side fillet 276 and suction side fillet 278 are added to securely couple tip shroud 236 to airfoil 234. In alternative embodiments, pressure side fillet 276 and/or suction side fillet 278 are formed unitarily with airfoil 234 and/or tip shroud 236.

In the exemplary embodiment, airfoil 234 defines at least one cooling channel 422 interiorly therein. More specifically, the at least one cooling channel 422 extends radially between root end 258 and tip end 260. Unless otherwise stated, the term "extends radially" includes a generally radial extent, as would be recognized by one of ordinary skill in the art, rather than being limited to an absolutely or perfectly radial extent. The at least one cooling channel 422 is configured to channel a cooling fluid (not shown), received in any suitable fashion at root end 258, toward tip end 260. Although only one cooling channel 422 is illustrated, it should be understood that in some embodiments, the illustrated cooling channel 422 is one of a plurality of cooling channels 422 defined in airfoil 234.

In the exemplary embodiment, tip shroud 236 includes a shroud plate 404 oriented generally perpendicular to the radial direction. Shroud plate 404 extends radially between a radially inner surface 414 and a radially outer surface 416, and has a thickness 418 defined therebetween which may vary across shroud plate 404. Moreover, shroud plate 404 extends axially from a leading edge 406 to a trailing edge 408, and circumferentially from a pressure side edge 410 to a suction side edge 412.

In the exemplary embodiment, tip shroud 236 further includes a shroud rail 420. Shroud rail 420 extends radially outward from shroud plate 404 towards casing 210, and extends circumferentially from pressure side edge 410 to suction side edge 412. In some embodiments, shroud rail 420 is formed separately from, and coupled to, shroud plate 404. In alternative embodiments, shroud rail 420 is formed integrally with shroud plate 404.

In the exemplary embodiment, shroud rail 420 is positioned axially at an offset 421 from leading edge 406 of shroud plate 404. For example, shroud rail 420 is positioned downstream from leading edge 406 by at least about fifteen percent of an axial length of shroud plate 404. In alternative embodiments, shroud rail 420 is positioned with respect to leading edge 406 in any suitable fashion that enables tip shroud 236 to function as described herein.

In the exemplary embodiment, tip shroud 236 includes no shroud rails other than shroud rail 420. In alternative embodiments, tip shroud 236 includes any suitable number of shroud rails in addition to shroud rail 420, such as but not limited to a leading edge shroud rail (not shown). In other alternative embodiments, tip shroud 236 does not include shroud rail 420.

Figure 4:
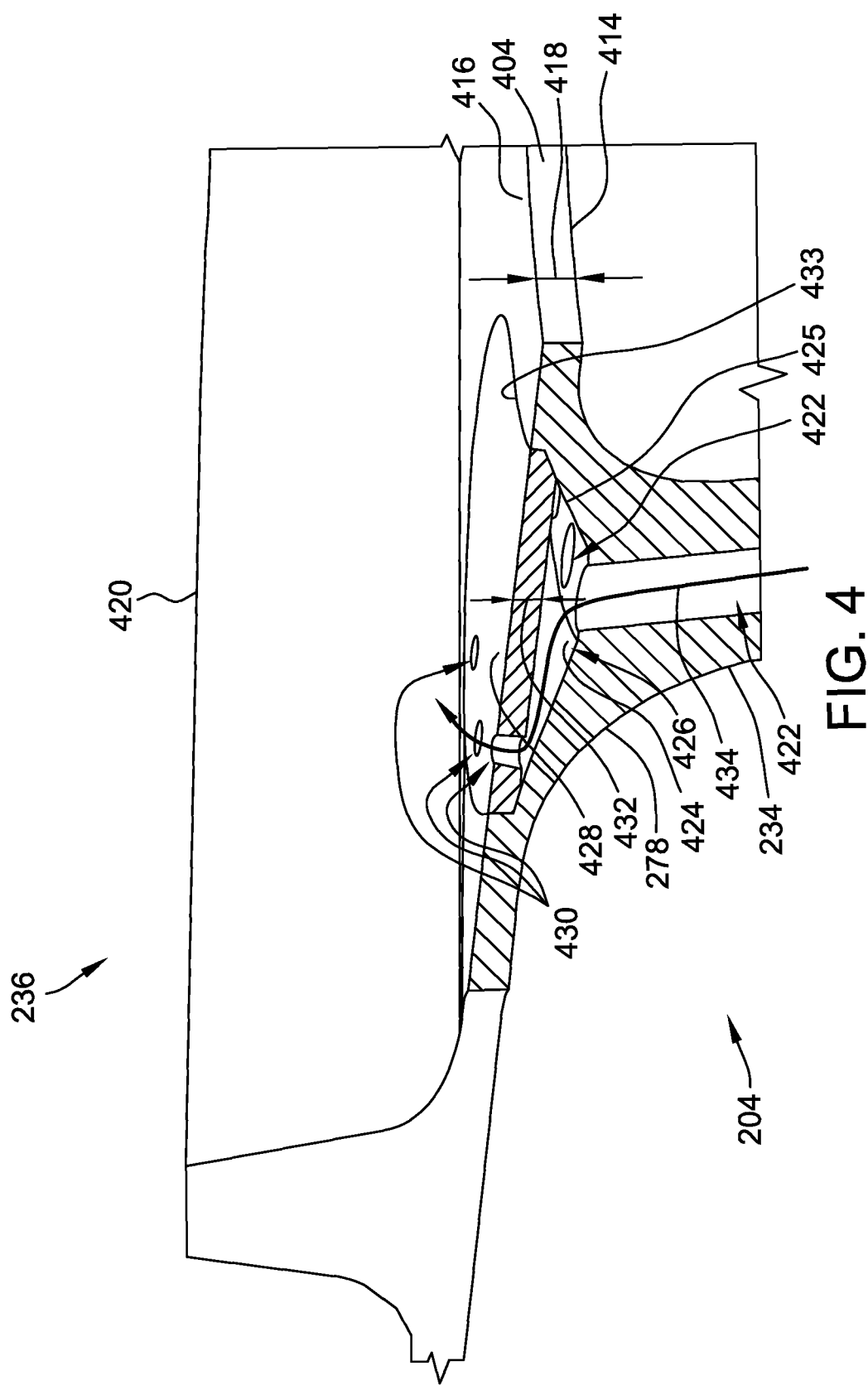
FIG. 4 is a cut-away perspective view of a portion of a first exemplary embodiment of a blade, such as the blade shown in FIG. 3.

FIG. 4 is a cut-away perspective view of a portion of a first exemplary embodiment of blade 204. Blade 204 includes a cavity 426 defined at least partially within at least one of suction side fillet 278 and pressure side fillet 276 and in downstream flow communication with at least one cooling channel 422. More specifically, at least one of pressure side fillet 276 and suction side fillet 278 includes an interior wall that at least partially defines cavity 426. For example, in the exemplary embodiment, an interior wall 424 of suction side fillet 278 at least partially defines cavity 426. Cavity 426 is configured to receive a flow of cooling fluid 434 from the at least one cooling channel 422 to facilitate cooling of suction side fillet 278 and a suction-side overhang portion of shroud plate 404. In the exemplary embodiment, cavity 426 is further at least partially defined in pressure side fillet 276. More specifically, at least a portion of cavity 426 is defined by an interior wall 425 of pressure side fillet 276.

In alternative embodiments, no portion of cavity 426 is defined in pressure side fillet 276. In other alternative embodiments, no portion of cavity 426 is defined in suction side fillet 278. For example, cavity 426 is defined by interior wall 425 of pressure side fillet 276, and cavity 426 is configured to receive the flow of cooling fluid 434 from the at least one cooling channel 422 to facilitate cooling of pressure side fillet 276 and a pressure-side overhang portion of shroud plate 404.

In the exemplary embodiment, cavity 426 is also in upstream flow communication with at least one exhaust aperture 430. More specifically, the at least one exhaust aperture 430 is configured to exhaust cooling fluid 434 from cavity 426 to an exterior of radially outer surface 416 of shroud plate 404. In some embodiments, exhausted cooling fluid 434 provides film cooling of outer surface of shroud plate 404. In alternative embodiments, cooling fluid 434 is exhausted in any suitable fashion that enables cavity 426 to function as described herein.

In the exemplary embodiment, each exhaust aperture 430 is offset, in a direction perpendicular to the radial direction, from each cooling channel 422, such that none of exhaust apertures 430 is radially aligned with any of cooling channels 422. Thus, an entirety of the cooling fluid 434 received in cavity 426 is channeled circumferentially and/or axially within cavity 426, rather than solely radially, facilitating increased cooling of suction side fillet 278 and the suction-side overhang portion of shroud plate 404 or, alternatively, increased cooling of pressure side fillet 276 and the pressure-side overhang portion of shroud plate 404. In alternative embodiments, exhaust apertures 430 are positioned with respect to cooling channels 422 in any suitable fashion that enables cavity 426 to function as described herein.

In the exemplary embodiment, cavity 426 is formed in blade 204 by removing material from the blade as initially formed. More specifically, airfoil 234, including channel 422 formed therein, and tip shroud 236 are coupled together at at least one of pressure side fillet 276 and suction side fillet 278 initially formed to include solid material in a location at which cavity 426 is to be formed. Material is then removed from shroud plate 404 at a location directly radially above an intended location of cavity 426, such that an entirety of thickness 418 of shroud plate 404 is removed and a radially upper surface of the at least one of suction side fillet 278 and pressure side fillet 276 is exposed. Material is further removed from the exposed radially upper surface of the at least one of suction side fillet 278 and pressure side fillet 276 until a preselected shape of the interior wall, that is, interior wall 424 of suction side fillet 278 and/or interior wall 425 of pressure side fillet 276, is obtained. In certain embodiments, forming cavity 426 by removal of material after airfoil 234 and tip shroud 236 are initially coupled together at a solid fillet facilitates efficiently forming cavity 426 without altering existing procedures and tooling for forming blade 204, such as via an existing casting process. In alternative embodiments, cavity 426 is formed in any suitable fashion that enables cavity 426 to function as described herein. For example, cavity 426 is defined by a removable core when blade 204 is initially cast.

In the exemplary embodiment, tip shroud 236 further includes a closure plate 428 that at least partially defines cavity 426. More specifically, closure plate 428 is coupled to shroud plate 404 such that at least a portion of cavity 426 is defined radially between interior wall 424 of suction side fillet 278, and/or between interior wall 425 of pressure side fillet 276, and closure plate 428. For example, cavity 426 is formed by removing material from the blade as initially formed, as described above, and closure plate 428 is shaped to couple against a complementary interior edge 433 of shroud plate 404 that was formed in the material-removal process. In the exemplary embodiment, closure plate 428 is configured to be flush with radially outer surface 416 of shroud plate 404. In alternative embodiments, closure plate 428 is positioned with respect to radially outer surface 416 in any suitable fashion that enables cavity 426 to function as described herein. In the exemplary embodiment, the at least one exhaust aperture 430 is defined in closure plate 428 and extends through a thickness 432 of closure plate 428 defined in the radial direction. In alternative embodiments, the at least one exhaust aperture 430 is defined in any suitable fashion that enables cavity 426 to function as described herein. In the exemplary embodiment, closure plate 428 is integrally formed as a single monolithic structure. In alternative embodiments, closure plate 428 is formed from a plurality of separate structural elements. In other alternative embodiments, tip shroud 236 does not include closure plate 428. For example, cavity 426 is initially cast into pressure side fillet 276 and/or suction side fillet 278 such that material need not be removed from shroud plate 404 to form cavity 426.

In the exemplary embodiment, an entirety of cavity 426 is positioned axially forward of shroud rail 420. In some embodiments, positioning of the entirety of cavity 426 axially forward of shroud rail 420 simplifies a process of forming cavity 426 while providing the cooling advantages described above. For example, formation of cavity 426 by removing material from the blade as initially formed, as described above, requires no removal of material from shroud plate 204 directly beneath shroud rail 420, thus facilitating preservation of a structural integrity of shroud rail 420. In alternative embodiments, cavity 426 has any suitable axial extent with respect to shroud rail 420 that enables cavity 426 to function as described herein.

FIG. 5 is a perspective view of a portion of a second exemplary embodiment of blade 204. The embodiment of FIG. 5 is substantially identical to the embodiment of FIG. 4 except as described below. In the exemplary embodiment, at least one exhaust aperture 430 is defined along a perimeter of closure plate 428. More specifically, the at least one exhaust aperture 430 is partially defined by a corresponding at least one slot 431 defined in the perimeter of closure plate 428, and partially defined by complementary interior edge 433 of shroud plate 404. In some embodiments, exhaust apertures 430 partially defined by complementary interior edge 433 of shroud plate 404 facilitate improved cooling efficiency of shroud plate 404 along complementary interior edge 433, as compared to exhaust apertures 430 defined entirely within an interior region of closure plate 428 (as shown in FIG. 4).

In the illustrated embodiment, the at least one exhaust aperture 430 includes a plurality of exhaust apertures 430 spaced around the perimeter of closure plate 428 and all partially defined by complementary interior edge 433 of shroud plate 404. In alternative embodiments, tip shroud 236 includes at least one exhaust aperture 430 partially defined by complementary interior edge 433 and at least one other exhaust aperture 430 entirely defined within closure plate 428. In other alternative embodiments, all of exhaust apertures 430 are entirely defined within an interior region of closure plate 428.

FIG. 6 is a perspective view of a portion of a third exemplary embodiment of blade 204. The embodiment of FIG. 6 is substantially identical to the embodiment of FIG. 4 except as described below. Closure plate 428 is not shown in FIG. 6 for clarity of illustration of cavity 426. In the exemplary embodiment, tip shroud 236 further includes at least one flow feature 527 disposed within cavity 426 and oriented to increase a cooling efficiency of cooling fluid 434 (shown in FIG. 4) received from the at least one cooling channel 422.

In the exemplary embodiment, the at least one flow feature 527 includes a plurality of flow features 527, and more specifically four flow features 527. In alternative embodiments, the at least one flow feature 527 includes any suitable number of flow features 527 that enables cavity 426 to function as described herein. In other alternative embodiments, tip shroud 236 does not include flow features 527.

In the exemplary embodiment, flow features 527 are coupled to interior wall 424 of suction side fillet 278 and extend radially outwardly therefrom into cavity 426. In alternative embodiments, at least one of flow features 527 is coupled to a radially inner side of closure plate 428 (shown in FIG. 4) and extends radially inwardly therefrom into cavity 426. Additionally or alternatively, at least one of flow features 527 is coupled to interior wall 425 of pressure side fillet 276 and extends radially outwardly therefrom into cavity 426.

In the exemplary embodiment, the at least one flow feature 527 includes at least one turbulator 500 that projects into cavity 426. More specifically, each turbulator 500 is sized and shaped such that a turbulence of the flow of cooling fluid 434 within cavity 426 is increased. For example, cavity 426 defines a greatest radial depth between closure plate 428 and one of interior wall 424 and interior wall 425, and turbulators 500 each extend over a radial depth that is no greater than about fifty percent of the greatest radial depth of cavity 426. In some embodiments, the increased turbulence facilitates more effective cooling of suction side fillet 278 and the suction-side overhang portion of shroud plate 404 or, alternatively, increased cooling of pressure side fillet 276 and the pressure-side overhang portion of shroud plate 404.

In the exemplary embodiment, each turbulator 500 has an elongated shape defining a generally triangular cross-section. In alternative embodiments, each turbulator 500 has any suitable shape and/or cross-section that enables cavity 426 to function as described herein. In the exemplary embodiment, turbulators 500 are generally aligned with the axial direction. In alternative embodiments, each turbulator 500 is oriented in any suitable fashion that enables cavity 426 to function as described herein.

Figure 7:
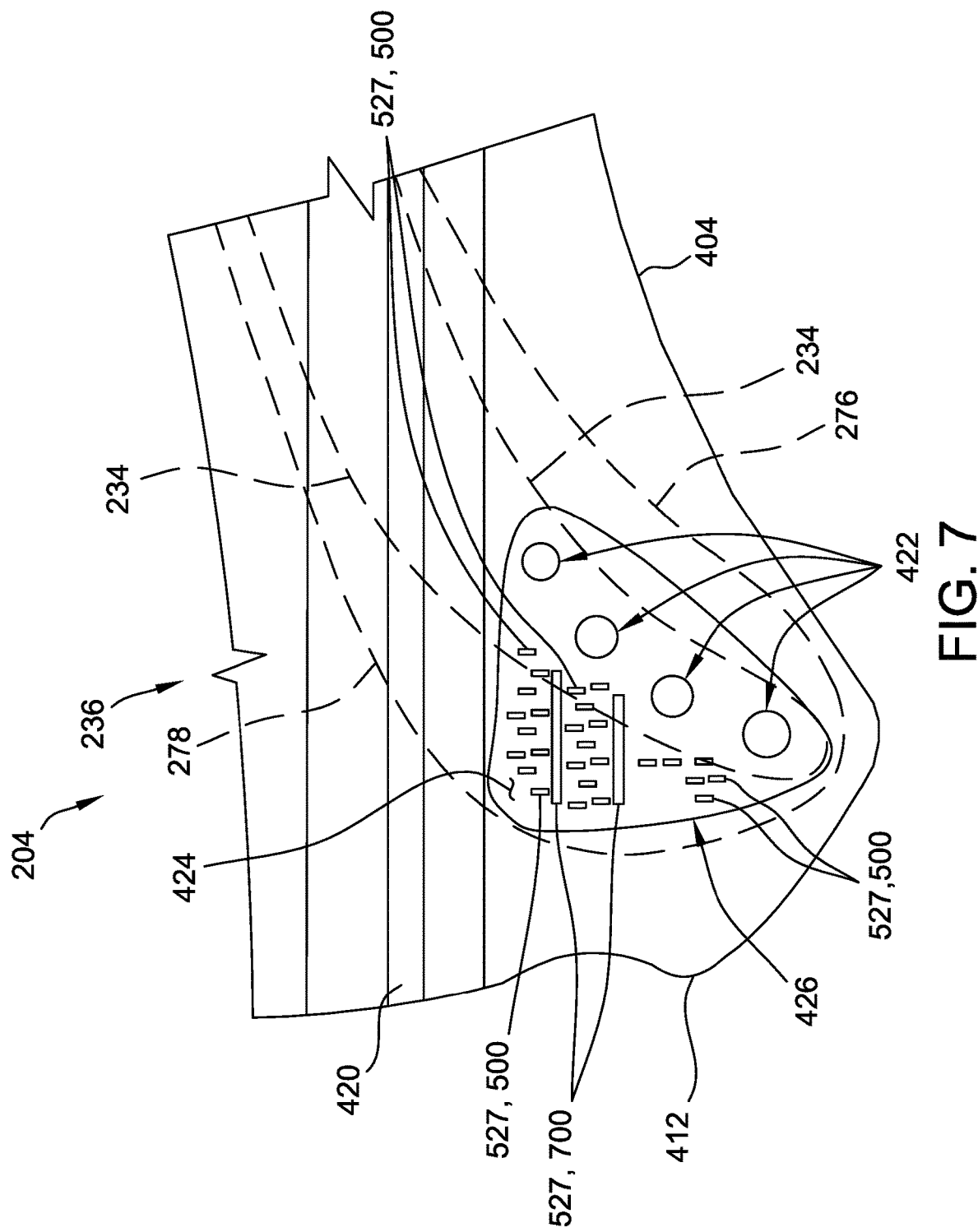
FIG. 7 is a plan view of a portion of a fourth exemplary embodiment of a blade, such as the blade shown in FIG. 3.

FIG. 7 is a plan view of a portion of a fourth exemplary embodiment of blade 204. The embodiment of FIG. 7 is substantially identical to the embodiment of FIG. 4 except as described below. Closure plate 428 is not shown in FIG. 7 for clarity of illustration of cavity 426. In the exemplary embodiment, tip shroud 236 again includes the at least one flow feature 527 disposed within cavity 426 and oriented to increase a cooling efficiency of cooling fluid 434 (shown in FIG. 4) received from the at least one cooling channel 422.

In the exemplary embodiment, the at least one flow feature 527 includes at least one partition 700. Each partition 700 has a direction of elongation and is oriented to direct the flow of cooling fluid 434 through cavity 426 along at least one preselected flow path generally parallel to the direction of elongation. For example, cavity 426 defines a radial depth between closure plate 428 and one of interior wall 424 and interior wall 425 along each partition 700, and partitions 700 each extend over a radial depth that is no less than about ten percent of the radial depth of cavity 426 along the respective partition 700. Thus, in contrast to turbulators 500, which tend to increase turbulence in the flow while not significantly altering an overall flow direction, partitions 700 tend to re-direct the flow of cooling fluid 434 as cooling fluid 434 encounters partitions 700. In some embodiments, the preselected flow path is selected to facilitate more effective cooling of suction side fillet 278 and the suction-side overhang portion of shroud plate 404 or, alternatively, increased cooling of pressure side fillet 276 and the pressure-side overhang portion of shroud plate 404. In alternative embodiments, tip shroud 236 does not include partitions 700.

In the exemplary embodiment, the at least one partition 700 includes a plurality of partitions 700, and more specifically two partitions 700. In alternative embodiments, the at least one partition 700 includes any suitable number of partitions 700 that enables cavity 426 to function as described herein. In the exemplary embodiment, the direction of elongation of partitions 700 is circumferential. In this context, the term "circumferential" includes a substantially circumferential orientation, as would be recognized by one of ordinary skill in the art, rather than being limited to an absolutely or perfectly circumferential orientation. In alternative embodiments, partitions 700 are oriented in any suitable fashion that enables cavity 426 to function as described herein.

In the exemplary embodiment, partitions 700 are coupled to interior wall 424 of suction side fillet 278 and extend radially outwardly therefrom into cavity 426. In alternative embodiments, at least one of partitions 700 is coupled to a radially inner side of closure plate 428 (shown in FIG. 4) and extends radially inwardly therefrom into cavity 426. Additionally or alternatively, at least one of partitions 700 is coupled to interior wall 425 of pressure side fillet 276 and extends radially outwardly therefrom into cavity 426.

In the exemplary embodiment, the at least one flow feature 527 also includes the at least one turbulator 500, as described above, sized and shaped such that a turbulence of the flow of cooling fluid 434 within cavity 426 is increased. In the exemplary embodiment, the at least one turbulator 500 includes a first plurality of turbulators 500 positioned axially between two circumferentially extending partitions 700. Further in the exemplary embodiment, the at least one turbulator 500 includes a second plurality of turbulators 500 positioned axially aft of an aftmost of the partitions 700, and a third plurality of turbulators 500 positioned axially forward of a foremost of the partitions 700. In alternative embodiments, the at least one turbulator 500 is positioned with respect to the at least one partition 700 in any suitable fashion that enables cavity 426 to function as described herein.

Figure 8:
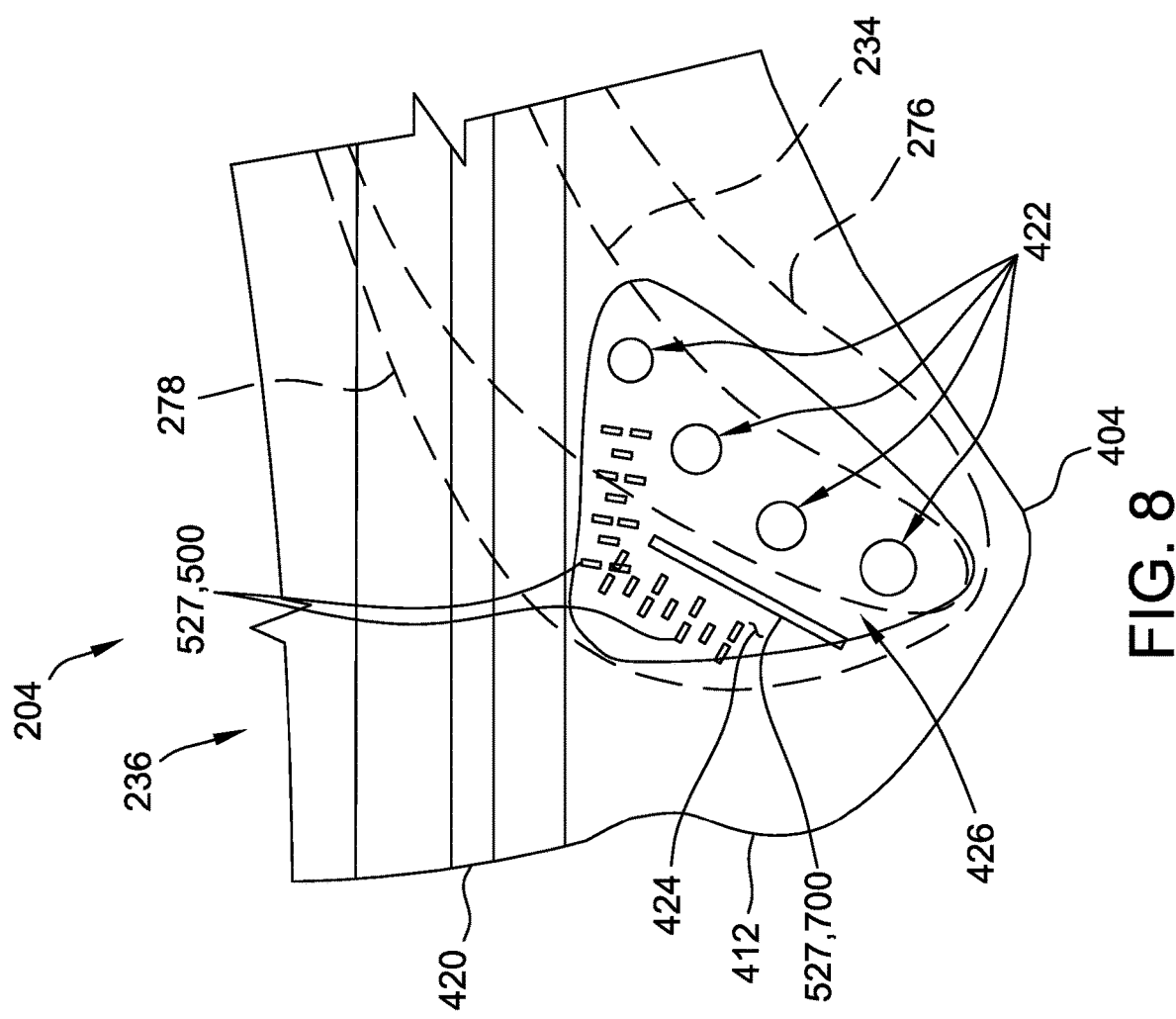
FIG. 8 is a plan view of a portion of a fifth exemplary embodiment of a blade, such as the blade shown in FIG. 3.

FIG. 8 is a plan view of a portion of a fifth exemplary embodiment of blade 204. The embodiment of FIG. 8 is substantially identical to the embodiment of FIG. 4 except as described below. Closure plate 428 is not shown in FIG. 8 for clarity of illustration of cavity 426. In the exemplary embodiment, the at least one flow feature 527 includes at least one partition 700. In the exemplary embodiment, the at least one partition 700 includes a single partition 700. In alternative embodiments, the at least one partition 700 includes any suitable number of partitions 700 that enables cavity 426 to function as described herein. In the exemplary embodiment, the direction of elongation of partition 700 is tangential to suction side 266 of airfoil 234. In this context, the term "tangential" includes a substantially tangential orientation, as would be recognized by one of ordinary skill in the art, rather than being limited to an absolutely or perfectly tangential orientation. In alternative embodiments, partition 700 is oriented in any suitable fashion that enables cavity 426 to function as described herein. In the exemplary embodiment, the at least one flow feature 527 also again includes the at least one turbulator 500. More specifically, the at least one turbulator 500 includes a first plurality of turbulators 500 positioned aft of an aftmost end of partition 700 and arranged in a circumferentially extending pattern, and a second plurality of turbulators 500 arranged in a pattern that extends parallel to partition 700. In alternative embodiments, the at least one turbulator 500 is positioned with respect to the at least one partition 700 in any suitable fashion that enables cavity 426 to function as described herein.

Figure 9:
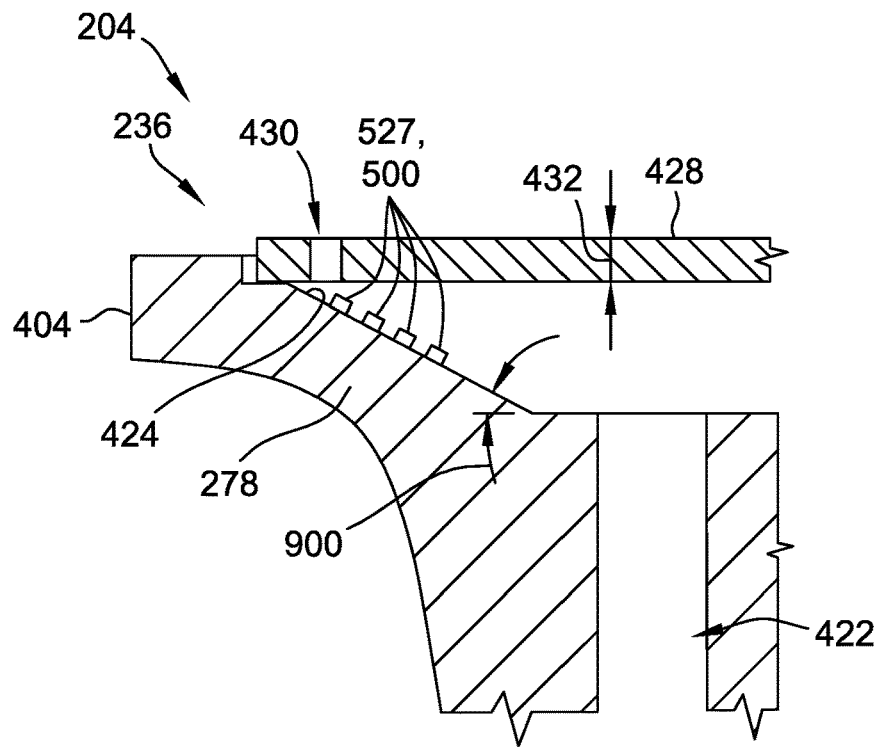
FIG. 9 is a sectional side view of a portion of a sixth exemplary embodiment a blade, such as the blade shown in FIG. 3.

FIG. 9 is a sectional side view of a portion of a sixth exemplary embodiment blade 204. The embodiment of FIG. 9 is substantially identical to the embodiment of FIG. 4 except as described below. In the exemplary embodiment, interior wall 424 is sloped radially outward, at an angle 900 with respect to a plane normal to the radial direction, between the at least one cooling channel 422 and at the at least one exhaust aperture 430. Although interior wall 424 is illustrated as sloping radially outward in generally linear fashion, it should be understood that in some embodiments, interior wall 424 slopes radially outward in non-linear fashion, that is, angle 900 varies along interior wall 424, as shown for example in FIG. 12. In certain embodiments, the radially outward slope of interior wall 424 between the at least one cooling channel 422 and at the at least one exhaust aperture 430 facilitates an increased flow velocity of cooling fluid 434 (shown in FIG. 4) along interior wall 424, and thus increased cooling of suction side fillet 278 and the suction-side overhang portion of shroud plate 404. In alternative embodiments, interior wall 424 is oriented between the at least one cooling channel 422 and at the at least one exhaust aperture 430 in any suitable fashion that enables cavity 426 to function as described herein. Additionally or alternatively, blade 204 also includes interior wall 425 of pressure side fillet 276 sloped radially outward at angle 900 with respect to the plane normal to the radial direction, in the manner described above with respect to interior wall 424.

In the exemplary embodiment, the at least one flow feature 527 again includes the at least one turbulator 500. More specifically, the at least one turbulator 500 includes a plurality of turbulators 500 arranged on and extending from sloped interior wall 424 of suction side fillet 278, or alternatively arranged on and extending from sloped interior wall 425 of pressure side fillet 276. In some embodiments, the increased turbulence again facilitates more effective cooling of suction side fillet 278 and the suction-side overhang portion of shroud plate 404, or alternatively increased cooling of pressure side fillet 276 and the pressure-side overhang portion of shroud plate 404. In alternative embodiments, tip shroud 236 does not include the at least one turbulator 500.

Figure 10:
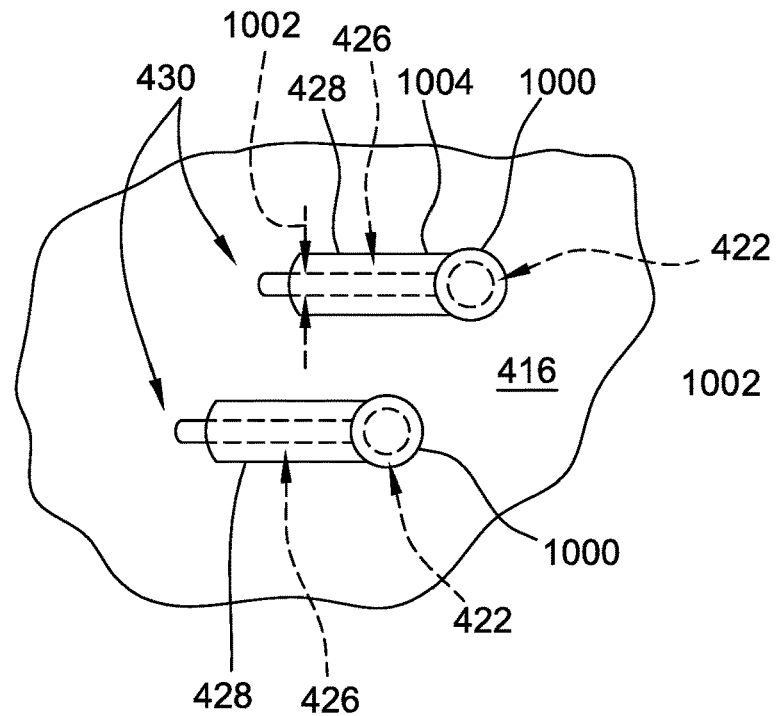
FIG. 10 is a plan view of a portion of a seventh exemplary embodiment of a blade, such as the blade shown in FIG. 3.
Figure 11:
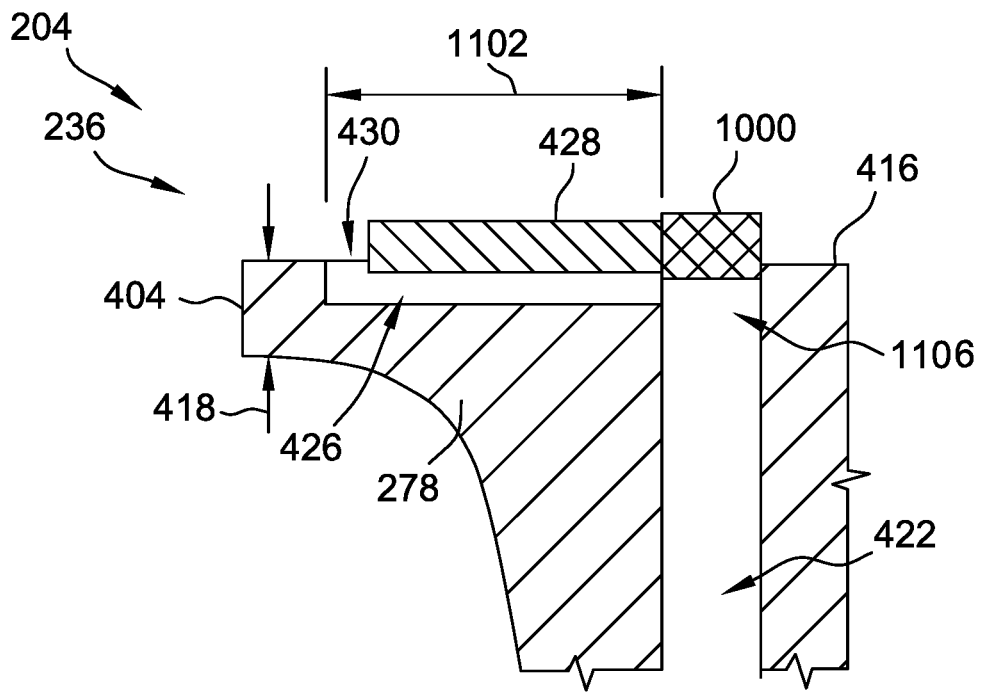
FIG. 11 is a sectional side view of an intermediate step in a process of forming the seventh embodiment of the blade shown in FIG. 10.
Figure 12:
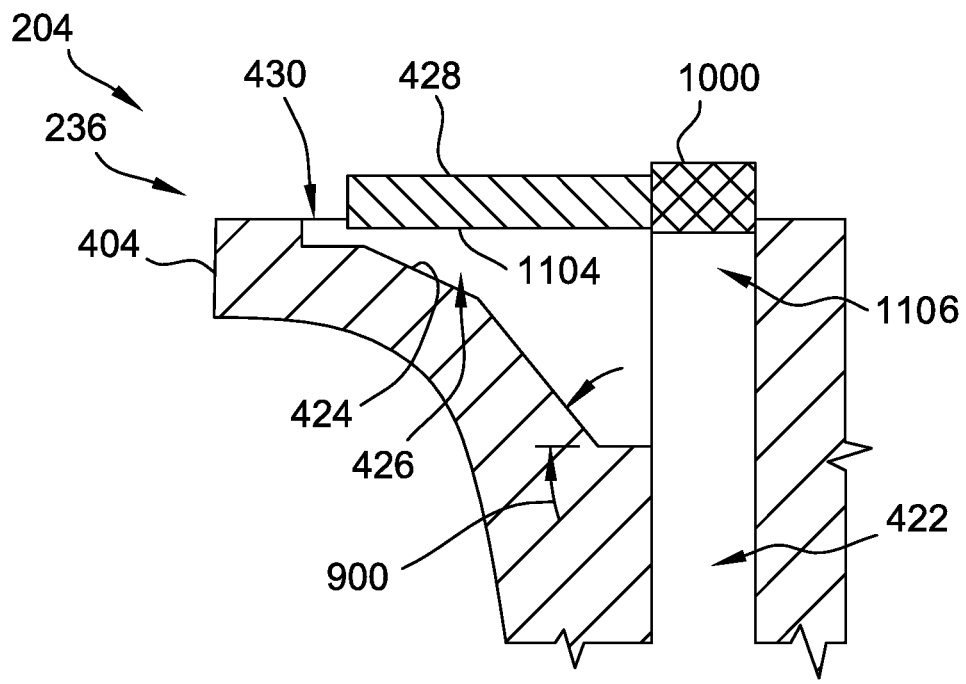
FIG. 12 is a sectional side view of the seventh exemplary embodiment of the blade shown in FIG. 10.

FIG. 10 is a plan view of a portion of a seventh exemplary embodiment of blade 204. FIG. 11 is a sectional side view of an intermediate step in a process of forming the seventh embodiment of blade 204 shown in FIG. 10. FIG. 12 is a sectional side view of the seventh embodiment of blade 204 shown in FIG. 10. The embodiment of FIGS. 10-12 is substantially identical to the embodiment of FIG. 4 except as described below. In the exemplary embodiment, cavity 426 is one of a plurality of cavities 426. Each cavity 426 is coupled directly in flow communication with a respective one of a plurality of cooling channels 422. Moreover, each of the plurality of cavities 426 has a width 1002, defined in a plane normal to the radial direction, and a length 1102 defined in a plane normal to the radial direction and generally perpendicular to width 1002. In the exemplary embodiment, length 1102 is at least eight times greater than width 1002. In alternative embodiments, length 1102 is any suitable measure with respect to width 1002 that enables cavity 426 to function as described herein.

In some embodiments, each cavity 426 is formed in a micro-channel forming process. For example, airfoil 234, including channel 422 formed therein, and tip shroud 236 are coupled together at at least one of pressure side fillet 276 and suction side fillet 278 initially formed as a solid mass, as described above. Material is then removed from shroud plate 404 using a micro-channel forming process at a location directly radially above an intended location of cavity 426, as shown in FIG. 11. For example, the micro-channel forming process includes at least one of laser machining, electro-chemical machining (ECM), and electro-discharge machining (EDM). In the exemplary embodiment, after an entirety of thickness 418 of shroud plate 404 is removed and a radially upper surface of the at least one of suction side fillet 278 and pressure side fillet 276 is exposed, material is further removed from the exposed radially upper surface of the at least one of suction side fillet 278 and pressure side fillet 276, for example again using the micro-channel forming process, until a preselected shape of interior wall 424 of suction side fillet 278 and/or interior wall 425 of pressure side fillet 276 is obtained, as shown in FIG. 12. In the exemplary embodiment, interior wall 424 again slopes radially outward in non-linear fashion, that is, angle 900 varies along interior wall 424. Additionally or alternatively, interior wall 425 again slopes radially outward in non-linear fashion, that is, angle 900 varies along interior wall 425. In alternative embodiments, interior wall 424 and/or interior wall 425 are oriented in any suitable fashion that enables cavity 426 to function as described herein. In certain embodiments, forming plurality of cavities 426 using a micro-channel forming process after airfoil 234 and tip shroud 236 are initially coupled together at a solid fillet enables efficiently forming cavities 426 without altering existing procedures and tooling for forming blade 204. In alternative embodiments, plurality of cavities 426 is formed in any suitable fashion that enables cavity 426 to function as described herein.

In the exemplary embodiment, each cavity 426 is further defined by a separate respective closure plate 428. In some embodiments, each closure plate 428 is formed from a wire 1004 having a length selected to be less than length 1102 of cavity 426 by an amount equal to an aperture size of exhaust aperture 430, and having a width selected to be greater than width 1002 of cavity 426, such that wire 1004 forms a sealed upper wall 1104 of cavity 426 along the length of wire 1004. In certain embodiments, forming separate respective closure plates 428 using respective wires 1004 further enables efficiently forming cavities 426 in a simple and economical fashion. In alternative embodiments, at least two of the plurality of cavities 426 is partially defined by a single closure plate 428. In other alternative embodiments, the at least one closure plate 428 is formed in any suitable fashion that enables cavity 426 to function as described herein.

In the exemplary embodiment, each cooling channel 422 is initially formed in blade 204 such that cooling channel 422 extends through radially outer surface 416 of shroud plate 404, and each cooling channel 422 is subsequently closed within shroud plate 404 by a respective plug 1000. More specifically, plug 1000 is coupled to shroud plate 404 at a radially outer end 1106 of the respective cooling channel 422. In some embodiments, initially forming cooling channels 422 through shroud plate 404 and closing cooling channels 422 using plugs 1000 further enables efficiently forming cavities 426 in a simple and economical fashion. In alternative embodiments, cooling channel 422 is formed in any suitable fashion that enables cavity 426 to function as described herein.

Although the at least one flow feature 527 is not illustrated in FIGS. 10-12, it should be understood that in alternative embodiments, tip shroud 236 includes the at least one flow feature 527 as described herein implemented in any suitable fashion that enables cavity 426 to function as described herein.

Figure 13:
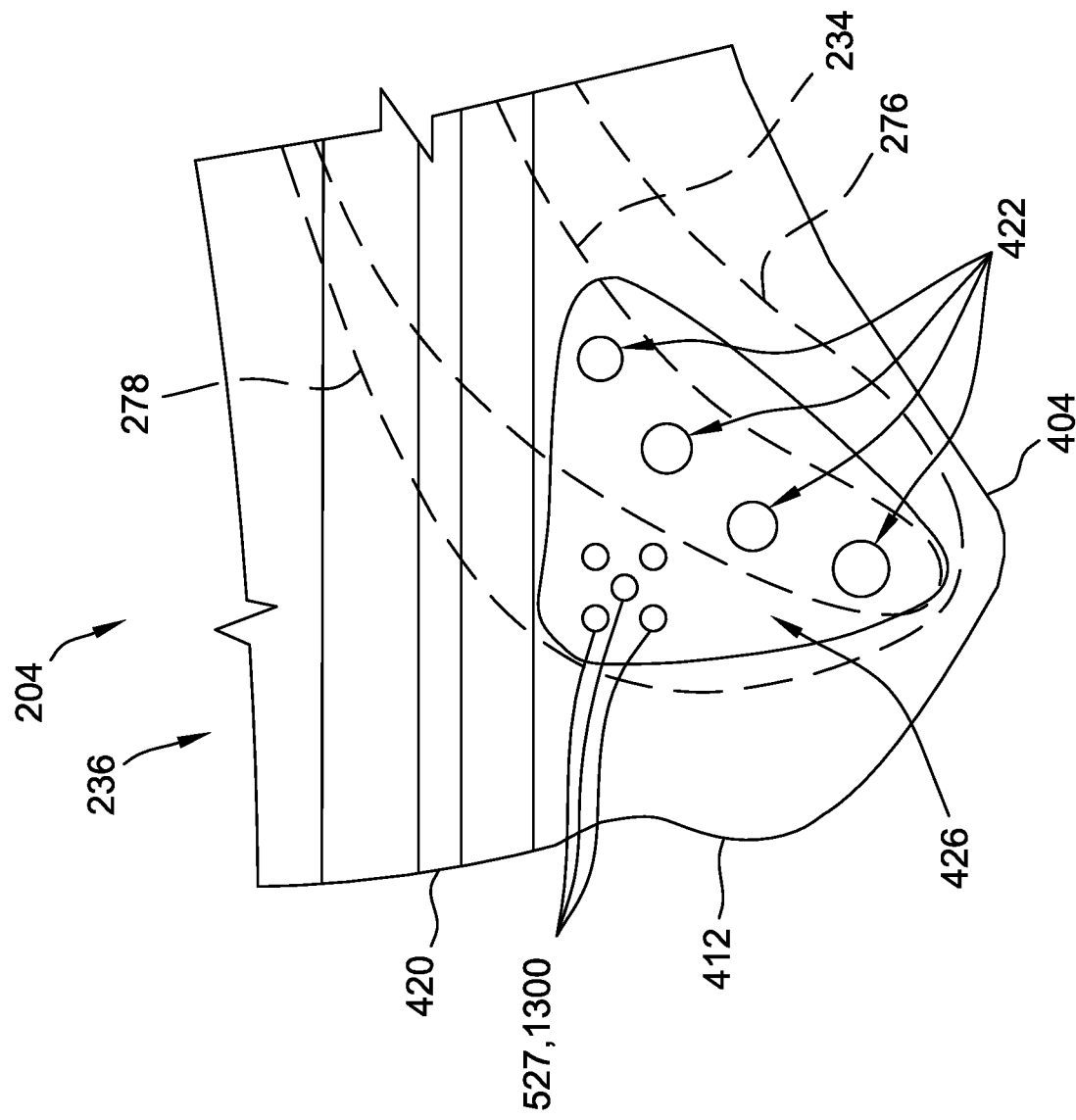
FIG. 13 is a sectional side view of a portion of an eighth exemplary embodiment of a blade, such as the blade shown in FIG. 3.

FIG. 13 is a sectional side view of a portion of an eighth exemplary embodiment blade 204. The embodiment of FIG. 13 is substantially identical to the embodiment of FIG. 4 except as described below. Closure plate 428 is not shown in FIG. 13 for clarity of illustration of cavity 426. In the exemplary embodiment, the at least one flow feature 527 includes at least one fin 1300. Each fin 1300 is positioned to direct the flow of cooling fluid 434 (shown in FIG. 4) through cavity 426 along at least one preselected flow path around fin 1300. For example, cavity 426 defines a radial depth between closure plate 428 and one of interior wall 424 and interior wall 425 at each fin 1300, and fins 1300 each extend over a radial depth that is no less than about ten percent of the radial depth of cavity 426 at the respective fin 1300. Moreover, in the exemplary embodiment, fins 1300 each extend over a radial depth that is substantially equal to the radial depth of cavity 426 at the respective fin 1300. Thus, similar to partitions 700 and in contrast to turbulators 500, fins 1300 tend to re-direct the flow of cooling fluid 434 as cooling fluid 434 encounters fins 1300. In some embodiments, the preselected flow path is selected to facilitate more effective cooling of suction side fillet 278 and the suction-side overhang portion of shroud plate 404, or alternatively increased cooling of pressure side fillet 276 and the pressure-side overhang portion of shroud plate 404. Moreover, in the exemplary embodiment, fins 1300 each extend over a radial depth that is substantially equal to the radial depth of cavity 426 at the respective fin 1300, such that fins 1300 additionally or alternatively facilitate structural support of closure plate 428 (shown in FIG. 4). In alternative embodiments, tip shroud 236 does not include fins 1300.

In the exemplary embodiment, the at least one fin 1300 includes a plurality of fins 1300, and more specifically five fins 1300. In alternative embodiments, the at least one fin 1300 includes any suitable number of fins 1300 that enables cavity 426 to function as described herein. In the exemplary embodiment, each fin 1300 has a circular cross-section in a plane normal to the radial direction. In this context, the term "circular" includes a substantially circular cross-section, as would be recognized by one of ordinary skill in the art, rather than being limited to an absolutely or perfectly circular cross-section. In alternative embodiments, each fin 1300 has any suitable cross-section that enables cavity 426 to function as described herein.

In the exemplary embodiment, fins 1300 are coupled to interior wall 424 of suction side fillet 278 and extend radially outwardly therefrom into cavity 426. In alternative embodiments, at least one of fins 1300 is coupled to a radially inner side of closure plate 428 (shown in FIG. 4) and extends radially inwardly therefrom into cavity 426. Additionally or alternatively, at least one of fins 1300 is coupled to interior wall 425 of pressure side fillet 276 and extends radially outwardly therefrom into cavity 426.

In alternative embodiments, in addition to the at least one fin 1300, the at least one flow feature 527 also includes the at least one turbulator 500 and/or the at least one partition 700, as described above, each positioned with respect to the at least one fin 1300 in any suitable fashion that enables cavity 426 to function as described herein.

Figure 14:
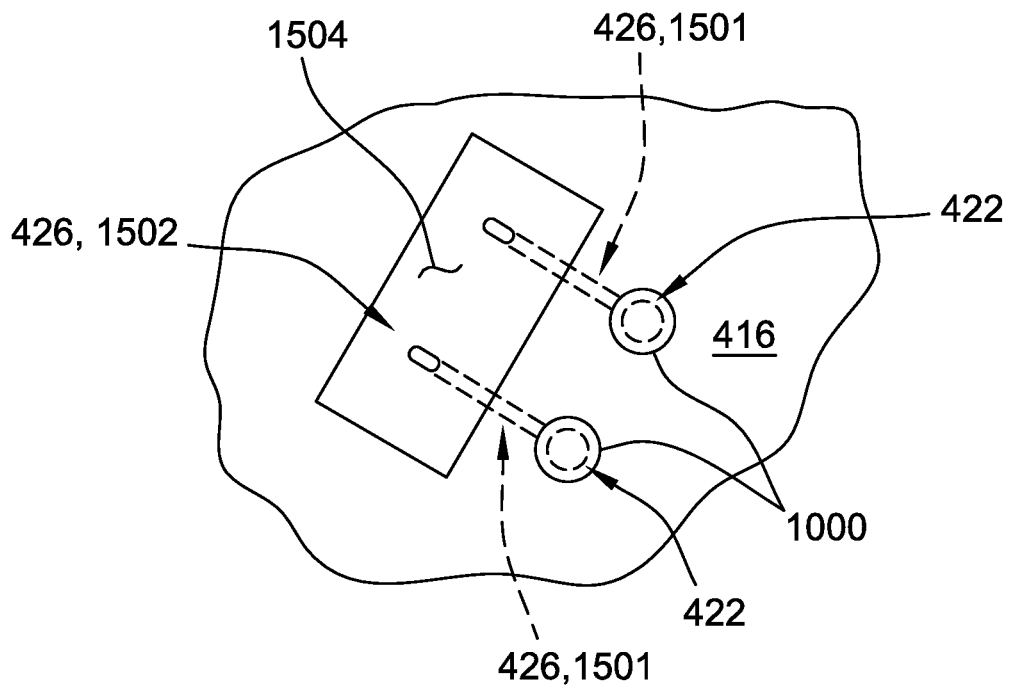
FIG. 14 is a plan view of a portion of a ninth exemplary embodiment of a blade, such as the blade shown in FIG. 3.
Figure 15:
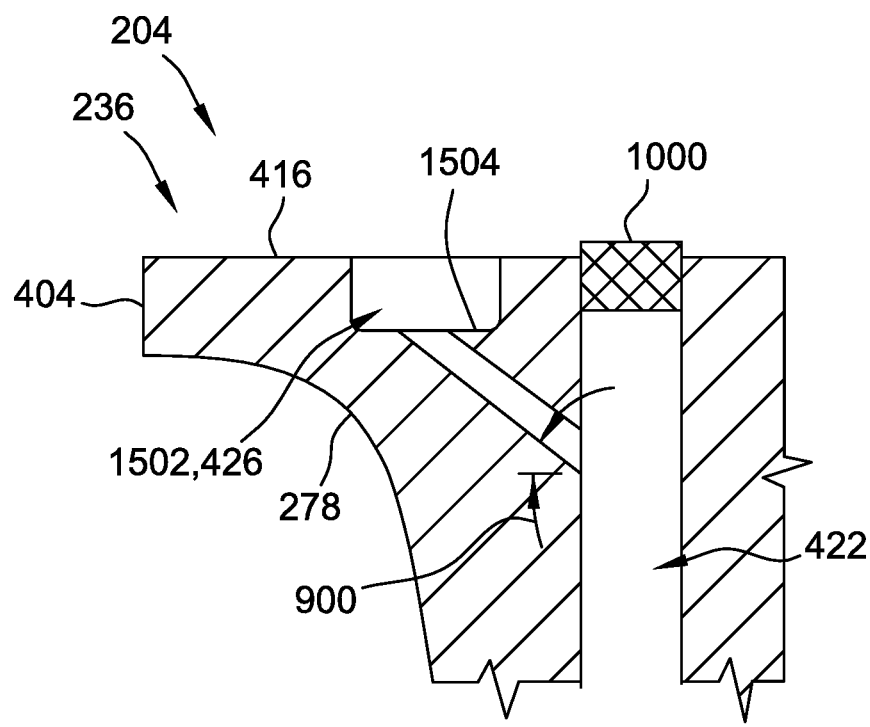
FIG. 15 is a sectional side view of the ninth exemplary embodiment of the blade shown in FIG. 14.

FIG. 14 is a plan view of a portion of a ninth exemplary embodiment of blade 204. FIG. 15 is a sectional side view of the ninth embodiment of blade 204 shown in FIG. 14. The embodiment of FIGS. 14 and 15 is substantially identical to the embodiment of FIG. 4 except as described below. Closure plate 428 is not shown in FIGS. 14 and 15 for clarity of illustration of cavity 426. In the exemplary embodiment, cavity 426 includes at least one first portion 1501 and a second portion 1502. The at least one first portion 1501 is at least partially defined by the interior wall 424 and/or 425 of the at least one of suction side fillet 278 and pressure side fillet 276. Second portion 1502 is defined in radially outer surface 416 of shroud plate 404 at least partially by an inner surface 1504 that is offset radially inwardly from radially outer surface 416. More specifically, each first portion 1501 is a circumferentially closed channel defined at least partially by interior wall 424 and/or interior wall 425 and coupled in flow communication between second portion 1502 and a respective cooling channel 422.

In some embodiments, cavity 426 is formed by removing material from the blade as initially formed. For example, airfoil 234, including channel 422 formed therein, and tip shroud 236 are coupled together at at least one of suction side fillet 278 and pressure side fillet 276 initially formed to include solid material in a location at which cavity 426 is to be formed, as described above. Material is then removed from shroud plate 404 to form second portion 1502. Next, each first portion 1501 is formed by removing material from the at least one of suction side fillet 278 and pressure side fillet 276 between a radially inner surface 1504 of second portion 1502 and the respective cooling channel 422. For example, the process of forming each first portion 1501 includes at least one of laser machining, electro-chemical machining (ECM), and electro-discharge machining (EDM) from radially inner surface 1504. In the exemplary embodiment, interior wall 424 and/or interior wall 425 are sloped radially outward, at an angle 900 with respect to a plane normal to the radial direction, between the respective cooling channel 422 and second portion 1502. Although interior wall 424 is illustrated as sloping radially outward in generally linear fashion, it should be understood that in some embodiments, interior wall 424 and/or interior wall 425 slope radially outward in non-linear fashion, that is, angle 900 varies along interior wall 424. In alternative embodiments, interior walls 424 and/or 425 are oriented in any suitable fashion that enables cavity 426 to function as described herein. In certain embodiments, forming plurality of cavities 426 having at least one first portion 1501 and second portion 1502 enables efficiently forming cavity 426 without altering existing procedures and tooling for forming blade 204. In alternative embodiments, cavity 426 is formed in any suitable fashion that enables cavity 426 to function as described herein.

Figure 16:
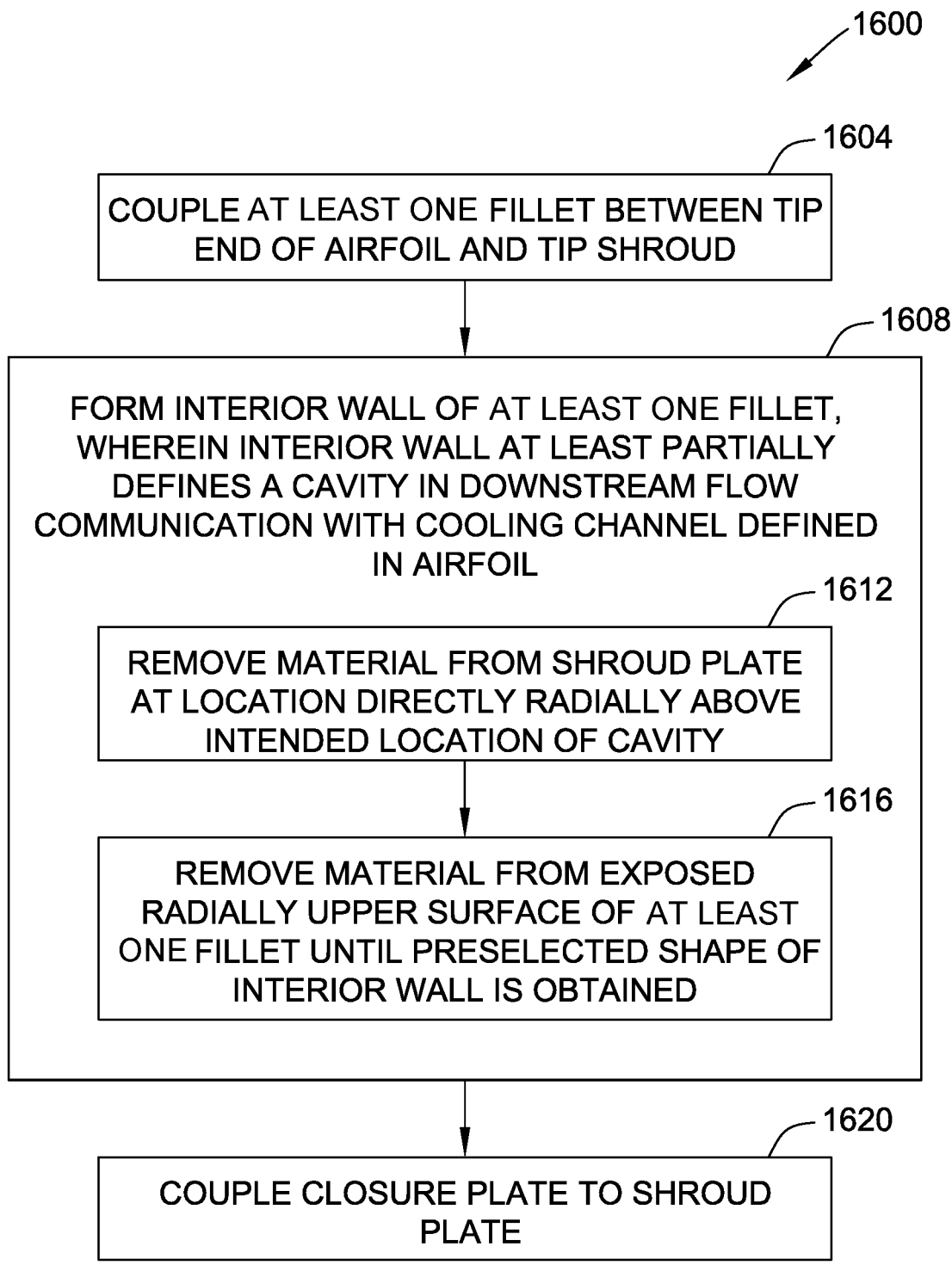
FIG. 16 is a flow diagram of an exemplary method of making a blade, such as the blade shown in FIG. 3.

FIG. 16 is a flowchart of an exemplary method 1600 of making a blade, such as blade 204 shown in FIG. 3. In the exemplary embodiment, method 1600 includes coupling 1604 at least one fillet, such as at least one of suction side fillet 278 and pressure side fillet 276, between a tip end of an airfoil, such as tip end 260 of airfoil 234, and a tip shroud, such as tip shroud 236. The airfoil extends radially from a root end, such as root end 258, to the tip end and includes a cooling channel, such as cooling channel 422, defined therein. Method 1600 also includes forming 1608 an interior wall of the at least one fillet, such as interior wall 424 and/or interior wall 425. The interior wall at least partially defines a cavity, such as cavity 426, in downstream flow communication with the cooling channel.

In certain embodiments, step 1608, forming the interior wall, is performed after step 1604, coupling the at least one fillet between the tip end and the tip shroud. In some such embodiments, the tip shroud includes a shroud plate, such as shroud plate 404, and step 1608, forming the interior wall, includes removing 1612 material from the shroud plate at a location directly radially above an intended location of the cavity, such that an entirety of a thickness of the shroud plate is removed and a radially upper surface of the at least one fillet is exposed, and removing 1616 material from the exposed radially upper surface of the at least one fillet until a preselected shape of the interior wall is obtained. Moreover, in some such embodiments, method 1600 further includes coupling 1620 a closure plate, such as closure plate 428, to the shroud plate. The closure plate at least partially defines the cavity. Additionally or alternatively, method 1600 includes any other suitable steps that further form blade 204 as describe above. For example, method 1600 includes suitable steps that incorporate the at least one flow feature 527.

The above-described embodiments of turbine blades overcome at least some disadvantages of known turbine blades having tip shrouds. In particular, the above-described embodiments facilitate improved cooling of a suction side fillet and a suction-side overhang portion of the tip shroud, or alternatively of the pressure side fillet and the pressure-side overhang portion of the tip shroud, thereby improving creep performance as compared to known turbine blades. Specifically, the embodiments include a cavity defined at least partially within at least one of the suction side fillet and the pressure side fillet and in downstream flow communication with a cooling channel defined in an airfoil of the blade. In some embodiments, the cavity is formed by removing material from the blade as initially formed, which facilitates efficiently forming the cavity without altering existing procedures and tooling for forming the blade, such as via an existing casting process. Also specifically, in some embodiments, an entirety of the cavity is positioned axially forward of a shroud rail of the tip shroud, which facilitates efficiently forming the cavity without substantially reducing a structural integrity of the shroud rail. Also specifically, in certain embodiments, the blade includes at least one flow feature that extends into the cavity and is oriented to increase a cooling efficiency of a cooling fluid received from the cooling channel.

Exemplary embodiments of a blade for a rotary machine and methods of making the blade are described above in detail. The apparatus is not limited to the specific embodiments described herein, but rather, elements of the blade may be utilized independently and separately from other elements described herein. For example, elements of the apparatus may also be used in combination with other blades for other rotary machines, and are not limited to practice with only the blade and gas turbine engine assembly as described herein. Rather, the exemplary embodiment may be implemented and utilized in connection with many other rotary machine applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, and to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blade comprising:
   an airfoil that extends in a radial direction from a root end to a tip end, said airfoil comprising a cooling channel defined therein;
   a tip shroud extending from said tip end, said tip shroud comprises a shroud plate comprising a radially outer surface;
   at least one fillet coupled between said tip end and said tip shroud, wherein said at least one fillet comprises an interior wall, said interior wall at least partially defines a single cavity in downstream flow communication with said cooling channel; and
   at least one exhaust aperture in flow communication with said single cavity, such that air discharged from said cooling channel is fed directly into said single cavity and is discharged across said radially outer surface of said shroud plate, wherein said at least one exhaust aperture is radially offset from said cooling channel such that exhaust cooling fluid is channeled axially within said single cavity and said interior wall is sloped radially outward between said cooling channel and said at least one exhaust aperture with respect to a plane normal to the radial direction, wherein said cavity comprises a first portion and a second portion, said second portion defined in said radially outer surface at least partially by an inner surface that is offset radially inwardly from said radially outer surface, said first portion comprises a circumferentially closed channel defined at least partially by said interior wall of said at least one fillet and coupled in flow communication between said second portion and said cooling channel.

2. The blade in accordance with claim 1, wherein said blade further comprises a closure plate coupled to said shroud plate, said closure plate at least partially defines said cavity.

3. The blade in accordance with claim 2, further comprising at least one flow feature coupled to at least one of said interior wall and said closure plate, said at least one flow feature extends into said cavity.

4. The blade in accordance with claim 3, wherein said at least one flow feature comprises at least one turbulator sized and shaped such that a turbulence of a flow of cooling fluid within said cavity is increased.

5. The blade in accordance with claim 3, wherein said at least one flow feature comprises at least one partition having a direction of elongation and oriented to direct a flow of cooling fluid through said cavity along at least one preselected flow path generally parallel to said direction of elongation.

6. The blade in accordance with claim 3, wherein said at least one flow feature comprises at least one fin that extends over a radial depth substantially equal to a radial depth of said cavity.

7. The blade in accordance with claim 1, wherein said tip shroud comprises a shroud rail, and wherein an entirety of said cavity is positioned axially forward of said shroud rail.

8. The blade in accordance with claim 1, wherein said cavity is one of a plurality of cavities and said cooling channel is one of a plurality of cooling channels, each of said cavities is coupled directly in flow communication with a respective one of said cooling channels, each of said cavities has a width and a length at least eight times greater than said width.

9. A rotary machine comprising:
   a combustor section; and
   a turbine section coupled downstream from said combustor section, said turbine section comprising at least one rotor assembly comprising at least one blade comprising:
      an airfoil that extends in a radial direction from a root end to a tip end, said airfoil comprising a pressure side, an opposite suction side, and a cooling channel defined therein;
      a tip shroud extending from said tip end;
      at least one fillet coupled between said tip end and said tip shroud, wherein said at least one fillet comprises an interior wall at least partially defining a cavity within said at least one fillet and in downstream flow communication with said cooling channel, wherein said cavity includes a suction side portion defined in said airfoil suction side and a pressure side portion defined in said airfoil pressure side, said cooling channel extends only through one of said suction side portion and said pressure side portion;
      at least one exhaust aperture in flow communication with said cavity, wherein said interior wall is sloped radially outward between said cooling channel and said at least one exhaust aperture with respect to a plane normal to the radial direction; and
      at least one turbulator coupled within said cavity, wherein said at least one turbulator extends in only one of said suction side portion and said pressure side portion, and wherein said at least one turbulator extends over a radial depth that is no greater than fifty percent of a greatest radial depth of said cavity.

10. The rotary machine in accordance with claim 9, wherein said tip shroud comprises a shroud plate, and wherein said at least one blade further comprises a closure plate coupled to said shroud plate, said closure plate at least partially defines said cavity.

11. The rotary machine in accordance with claim 10, wherein said at least one exhaust aperture is defined at least partially in said closure plate and is configured to exhaust cooling fluid from said cavity to an exterior of said shroud plate.

12. The rotary machine in accordance with claim 11, wherein said at least one exhaust aperture is defined entirely within an interior region of said closure plate.

13. The rotary machine in accordance with claim 11, wherein said at least one exhaust aperture is defined along a perimeter of said closure plate.

14. The rotary machine in accordance with claim 11, wherein said at least one exhaust aperture is offset, in a direction perpendicular to the radial direction, from said cooling channel.

15. A method of making a blade, said method comprising:
   coupling at least one fillet between a tip end of an airfoil and a tip shroud, wherein the airfoil extends in a radial direction from a root end to the tip end and includes a cooling channel defined therein, wherein the tip shroud includes a shroud plate comprising a radially outer surface;

forming an interior wall of the at least one fillet, wherein the interior wall at least partially defines a single cavity in downstream flow communication with the cooling channel; and forming at least one exhaust aperture in flow communication with the single cavity such that the cooling channel is directly connected to the single cavity, the at least one exhaust aperture is oriented to exhaust cooling fluid from the single cavity across the radially outer surface of the shroud plate, wherein the at least one exhaust aperture is radially offset from the cooling channel such that exhaust cooling fluid is channeled axially within the single cavity and the interior wall is sloped radially outward between the cooling channel and the at least one exhaust aperture with respect to a plane normal to the radial direction, the single cavity including a first portion and a second portion, the second portion defined in the radially outer surface at least partially by an inner surface that is offset radially inwardly from the radially outer surface, the first portion including a circumferentially closed channel defined at least partially by the interior wall of the at least one fillet and coupled in flow communication between the second portion and the cooling channel.

16. The method according to claim 15, wherein forming the interior wall is performed after coupling the at least one fillet between the tip end and the tip shroud.

17. The method according to claim 16, wherein forming the interior wall comprises:

removing material from the shroud plate at a location directly radially above an intended location of the cavity, such that an entirety of a thickness of the shroud plate is removed and a radially upper surface of the at least one fillet is exposed; and removing material from the exposed radially upper surface of the at least one fillet until a preselected shape of the interior wall of the at least one fillet is obtained.

18. The method according to claim 17, further comprising coupling a closure plate to the shroud plate, wherein the closure plate at least partially defines the cavity.

* * * * *